Figure 1:
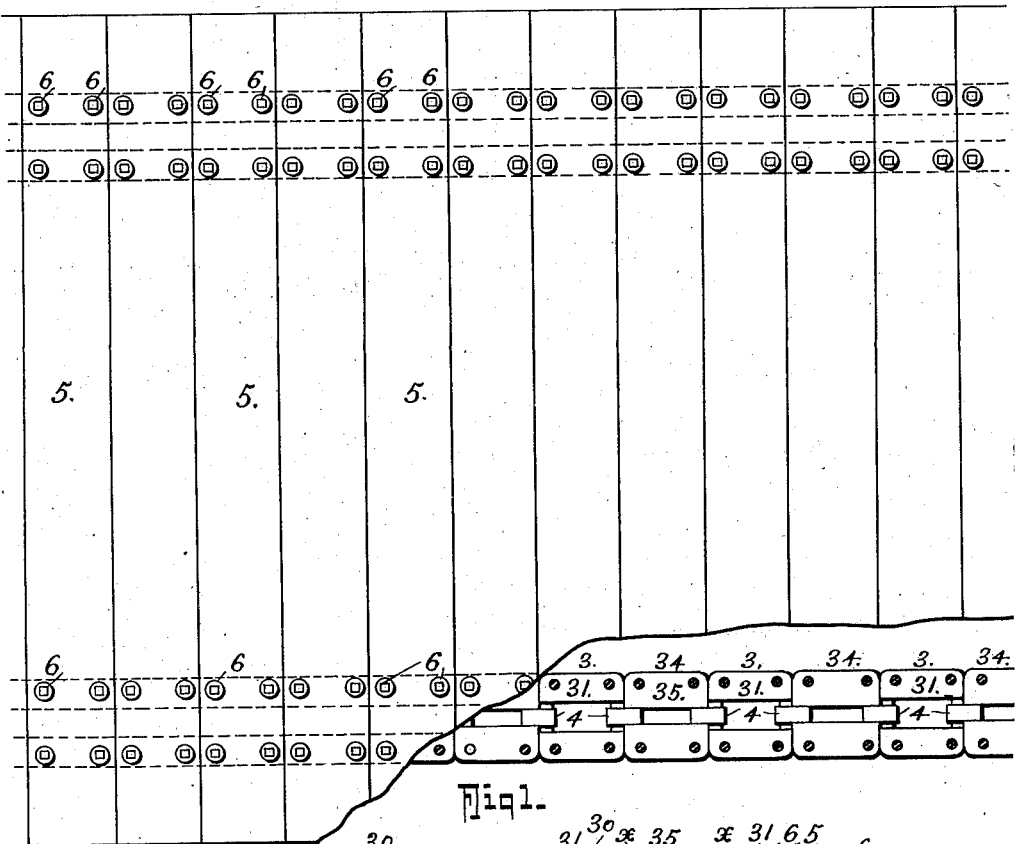

J. K. BOLAND.
CHAIN CONVEYER.
APPLICATION FILED APR. 25, 1910.

965,067.

Patented July 19, 1910.

2 SHEETS—SHEET 1.

WITNESSES:
John T. Schrott
H. Woodard

INVENTOR
Joseph K. Boland,
BY
Fred J. Dieterich
ATTORNEYS

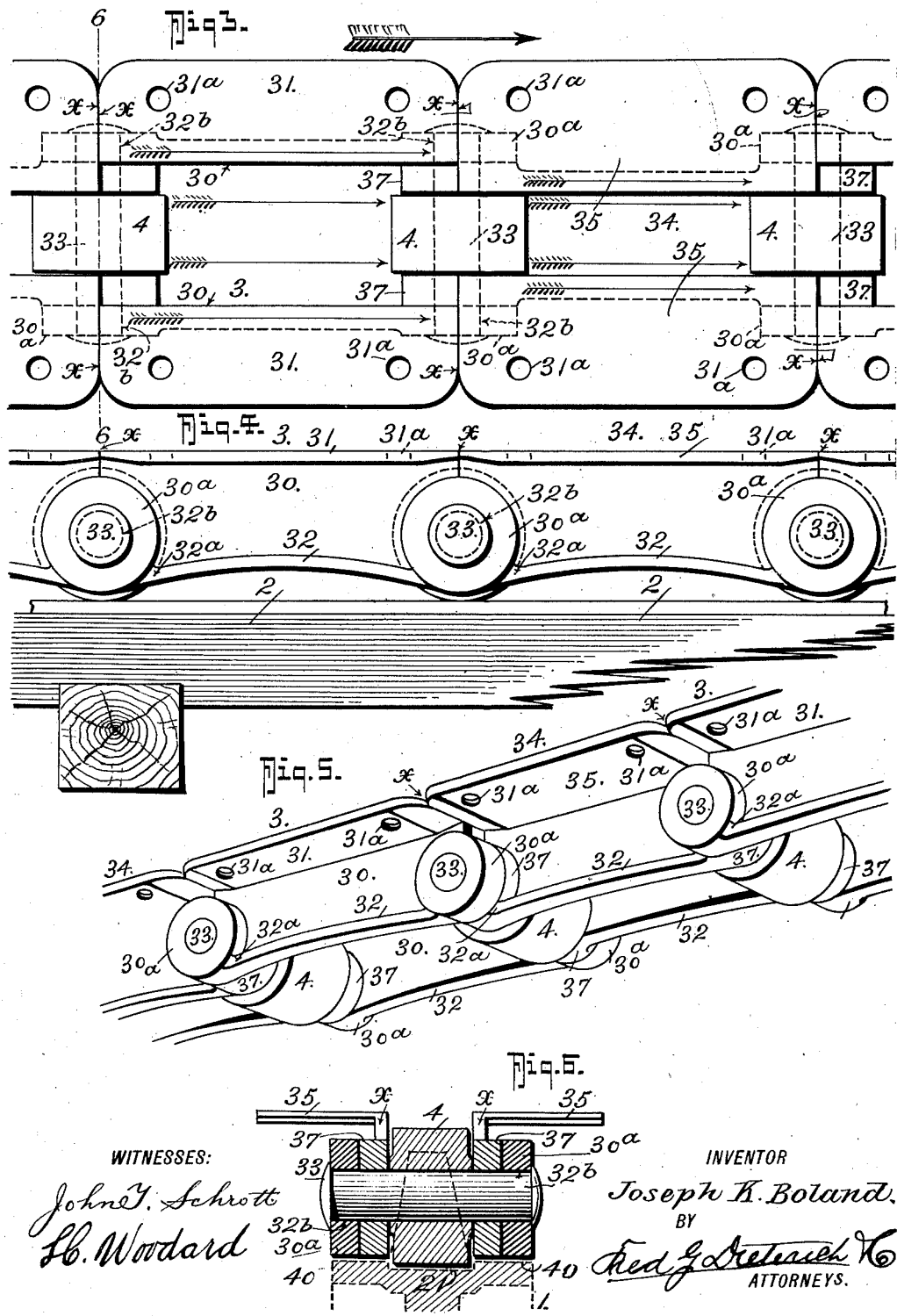

UNITED STATES PATENT OFFICE.

JOSEPH KENNARD BOLAND, OF NEW ORLEANS, LOUISIANA, ASSIGNOR TO BOLAND MACHINE & MANUFACTURING CO., INCORPORATED, OF NEW ORLEANS, LOUISIANA.

CHAIN CONVEYER.

965,067.                     Specification of Letters Patent.     Patented July 19, 1910.

Application filed April 25, 1910. Serial No. 557,454.

*To all whom it may concern:*

Be it known that I, JOSEPH K. BOLAND, of New Orleans, in the parish of Orleans and State of Louisiana, have invented a new and Improved Chain Conveyer, of which the following is a specification.

This invention, while generally relating to improvements in endless chain conveyers, more particularly has reference to that type of chain conveyers, used for carrying sugar cane and the like, which, in the practical arrangement thereof, at times pass unsupported from one bearing pulley to another, and whose link members have such coöperative abutting portions whereby the unsupported portions of the chain are held from sagging.

Chains of the type above specifically referred to have been provided, whose pivotal connections are usually in the nature of rule joints, see for example Patent No. 888,918, and in the said forms of chains the links have offsets whereby one end of one link straddles the adjacent end of the next link, the straddling portions of each pair of links forming the bearings for the journals or pins on which rollers are mounted that support the chain when traveling over trackways.

From practical experience with chains of the general type referred to and now in common use, I have found that while the said chains are generally effective and practical for their purpose they do not meet all the requirements desired, for the following reasons. The off-setting of the link members, that is, the pulling portion of one end of the links being out of straight alinement with the pulling end of the other links, causes, as it were, the draft strain of the chain to be divided into a series of angle pulling points, the line of draft strain on each link deviating from the direct, on the angle extending from the widest cross pin bearing point at one end to the narrowest cross pin bearing point at the other end of the link. This multiple direction of pull strain on the chain has a tendency to stop the rollers from turning at times and in consequence soon wears the said rollers flat and uneven, and by reason of the irregularity of the pull strain of the entire chain the link connections are weakened and are too soon broken.

The primary object of my invention is to provide a conveyer chain of the general type referred to in which special provision is made for insuring a uniform and direct pulling strain on all of the link connections so that the danger of the rollers dragging or becoming choked on their pintles by reason of torsional or twisting strains is entirely overcome and the life of the chain lengthened thereby.

Another object of my invention is to provide a link so shaped that it will the more readily pass around and seat to the sprocket or pull wheels, and in which the web construction is such as to acquire the maximum strength with a minimum weight or size.

My invention also embodies certain features of construction of the link whereby the vertical abutting or "rule joint" connection is rendered substantial and of such character that the pintle or roller bearings are relieved of undue strain to allow the rollers to turn freely and without binding.

Figure 2:
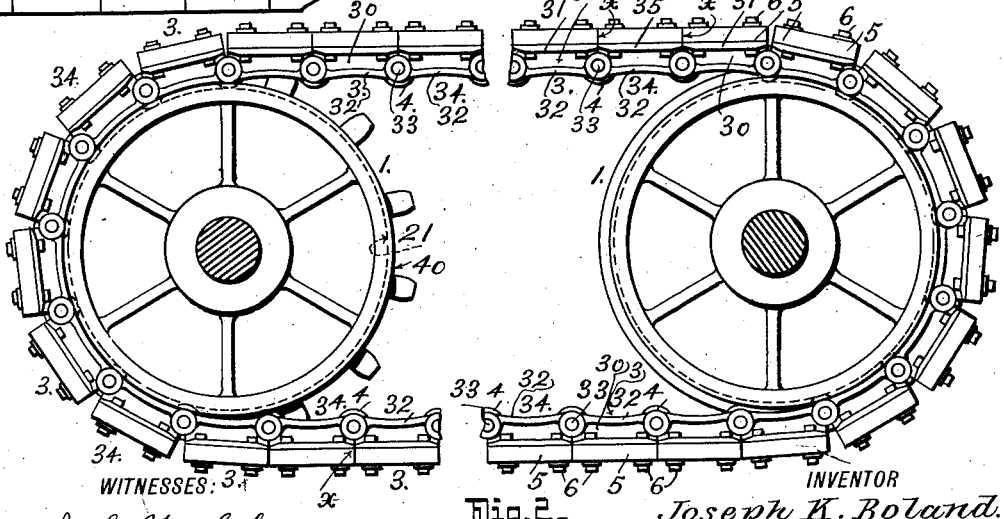

With other objects in view that will hereinafter appear, my invention comprises a conveyer chain construction having the peculiar construction and combination of parts hereinafter fully explained, specifically set out in the claim and illustrated in the accompanying drawings, in which:

Figure 1, is a top plan view of an endless conveyer belt, embodying my improved links, parts of the platform being broken away to better illustrate the same. Fig. 2, is a cross section through the sprocket wheels. Fig. 3, is an enlarged detail top plan of several of the links. Fig. 4, is a side elevation thereof showing a part of the track way. Fig. 5, is an inverted perspective view of the links. Fig. 6, is a section on the line 6—6 of Fig. 3.

In the practical arrangement of my invention as shown, 1—1 designate the sprocket wheels that form end bearings for the endless chain, the specific construction of the links of which forms the essential feature of my invention.

2 designates the platform or trackway over which the rollers of the chain travel when the chain is passing the loading point or position. The chain is composed of a series of links arranged in pairs and as each pair of links is formed and connected alike a detailed description of one pair will suffice for all. In my construction, each pair of links comprises one set of like, formed opposite members 3, each of which has a vertical wall 30, the upper end of which merges with an outwardly extended horizontal flange 31 and whose lower end merges with an outwardly extended flat web 32, the outer edge of which is rounded off as at 32ª to merge with the wall or vertical web 30 and the opposite ends whereof have circular extensions 30ª to form bearings apertured as at 32ᵇ to loosely receive the headed pintles 33 that form the journals for the rollers 4, presently again referred to. Between the ends of the links 34 rollers 4—4 are mounted. The links 34 have larger flange surfaces 35 than the flange surfaces 31 of the links 3. The slats 5 are secured to the flanges 35 and 31 by nutted bolts 6 that pass through apertures 31ª in the flanges, as indicated in the drawings. The vertical wall or web portions of the link members 34 have bearings or apertured extensions 37 corresponding to the extensions 30ª of the link members 3.

By reason of the peculiar arrangement and construction of the parts, so far as described, it will be apparent by referring to Figs. 3 to 6 that the connection of the links is such that an uninterrupted straightway line of draft is provided for, see arrows Fig. 3, the entire length of the chain, thus insuring a perfect transverse bearing between the sprockets on the sprocket wheels and the rollers 4 and by reason thereof the said rollers and the ends of the several sets of links may have a comparatively loose connection with the coupling members 33.

The bottom webs of the vertical walls of the chain sections are widened so that the combined contacting face of two sets of connected links is of a width substantially the width of the smooth opposite side bearing surfaces 40 40 of the sprocket wheels, to insure a solid bearing of the joined ends of the two sets of links as they pass over the large sprocket wheels. To further provide for the perfect contacting of the chain with the said wheels the said base or bottom web portions of the link sections are curved on an arc concentric with the axis of the sprocket wheels, and to maintain the chain against lateral creeping in passing over the said sprocket wheels, the periphery of the toothed sprocket wheel is grooved at 21 between the teeth to receive the rollers 4 which rollers are of a diameter and are so mounted on the chain that they project into the groove and prevent lateral creeping or movement of the chain. The other sprocket wheel which does not perform a driving function may have the teeth omitted and the groove continued all way around, as indicated to the right of Fig. 2 of the drawings and a flange may be provided on such non-driving sprocket wheels at the outer side to assist the function of the groove, the flange being indicated adjacent to the number 1 on the right hand wheel in Fig. 2 of the drawings.

The horizontal or slat receiving flanges have their ends straight to form horizontal abutments $x$—$x$ that engage to prevent the chain from sagging at the unsupported points, it being obvious that since the flange portions of the links take up the end thrusts as the chain tends to sag, undue down strain on the pivotal connections is entirely overcome.

Having thus described my invention, what I claim is:

The combination with a sprocket wheel having a series of groove sections with a tooth between each of said sections, and a flat bearing surface at each side of the groove and teeth; of an endless conveyer chain consisting of main and supplemental links arranged in continuous pairs, each link including a pair of opposite members formed of a vertical wall, the ends of which terminate in apertured bearing members, the upper ends of the walls merging with outwardly projected slat receiving flanges, the flanges of the supplemental link members being of less width than the flanges on the main link members, the lower ends of the vertical walls terminating in outwardly projected bearing webs, said webs being curved on an arc concentric with the sprocket wheel and adapted for riding over the smooth portions of the said wheel, the link members having the narrow slat receiving flanges lapping the ends of the other link member, coupling pins that loosely join the ends of the several members, rollers journaled on said pins with their lower edges projected below the link members to engage with the groove section in the sprocket wheel.

JOSEPH KENNARD BOLAND.

Witnesses:
A. H. RITTER,
H. C. WHITTAKER.